United States Patent
Ringer

[11] 3,975,729
[45] Aug. 17, 1976

[54] TARGET DETECTING SYSTEM
[75] Inventor: Hayden N. Ringer, Palmyra, N.J.
[73] Assignee: Aeronutronic Ford Corporation, Blue Bell, Pa.
[22] Filed: May 31, 1957
[21] Appl. No.: 662,944

[52] U.S. Cl. .............................. 343/5 PD; 328/111; 328/133; 328/139; 343/7 PF; 343/13 R
[51] Int. Cl.² .......................................... G01S 9/06
[58] Field of Search ................. 343/5, 7, 10, 11, 13, 343/17.1, 7 PF, 13 R, 17.1 R, 5 PD; 328/111, 133, 139, 141

[56] References Cited
UNITED STATES PATENTS
3,076,191  1/1963  Williams .................. 343/13 R X
3,725,925  4/1973  Holmgren .................. 343/7 PF X Primary Examiner—T.H. Tubbesing
Attorney, Agent, or Firm—Robert D. Sanborn

EXEMPLARY CLAIM

1. A radar detection system comprising means for generating time spaced pulses of high frequency energy, said pulses having a width equal to $a/nf_r$, where $a$ and $n$ are integers and $f_r$ is the pulse repetition frequency, means for projecting said energy pulses into space, receiver means for receiving target reflected echoes of said projected pulses, said receiver means including a heterodyne mixer, a bandpass circuit connected to the output of said heterodyne mixer, and means for supplying received echo signals to said mixer, means for supplying pulses corresponding to said generated pulses in pulse repetition frequency, pulse width and frequency to said heterodyne mixer as a local oscillator signal, said bandpass circuit having a passband centered at the frequency $nf_r$, the width of said passband being not greater than $f_r$.

19 Claims, 11 Drawing Figures

INVENTOR.
HAYDEN N. RINGER
BY
ATTORNEY

INVENTOR.
HAYDEN N. RINGER
BY
ATTORNEY

INVENTOR.
HAYDEN N. RINGER
BY
ATTORNEY

TARGET DETECTING SYSTEM

The present invention relates to radar detection systems, and more particularly to proximity indicating systems operating on the pulse-Doppler principle.

Certain proposed types of radar systems for detecting the presence of an object within a given range of the transmitting antenna employ a transmitted pulse having a duration equal to the time of propagation of electromagnetic energy in space to a selected maximum range and return. A heterodyne mixer circuit is provided for combining an attenuated signal corresponding in time to the transmitted pulse, with the received target echo signals. The reflected signal from any target nearer the transmitting antenna than the selected maximum range, and within the radiation field of the antenna, will return to the radar system before the transmitted pulse has terminated. Therefore, signals corresponding to targets within the selected maximum range will appear at the output of the mixer circuit. The output of the heterodyner mixer is of the order of 60 db less video detection of the received signal in the absence of the local oscillator signal from the transmitter than it is for heterodyne detection during the overlap period. Thus, targets beyond the selected maximum range will not cause signals of any appreciable amplitude to appear at the output of the mixer for the reason that there is no overlap between the received signal and the transmitted signal and hence no local oscillation is supplied to the mixer circuit at the time that the out of range echoes are supplied to the mixer circuit.

Ordinarily, heterodyning the transmitted signal with the received echo signal would provide a signal of zero frequency, that is, a d.c. signal. However, if the target which reflects the signal is moving with respect to the radar system, the output of the mixer will have Doppler components having frequencies related to the relative velocity of the target and the radar system. Previous radar systems have employed audio amplifiers following the mixer to detect the Doppler components. These systems suffer from the disadvantage that the Doppler frequencies may be as low as 1.5 to 2 k.c. while microphonic signals in the radar system may extend up to 5 k.c. or more. The microphonic signals tend to mask the relatively-weak Doppler components of the target echo signals. The unwanted microphonic signals and desirable target echo signals cannot be separated by ordinary filtering techniques owing to the overlapping of the frequency spectra of the two signals. All prior systems, therefore, have suffered from unwanted complexity, or the difficulty of detecting a relatively-weak, low-frequency Doppler signal in the presence of microphonic signals or relatively large harmonic components of the transmitted wave. Another problem frequently encountered in proximity detection systems is interference from "self targets". Proximity detection systems may be employed to detect targets at a range which may vary from a few feet to a few yards. If the vehicle, missile or other structure supporting the radar system has a dimension of the same order of magnitude as this range, a portion of the transmitted energy may be reflected by a portion of the supporting structure and returned to the antenna as a "target echo". Thus the system may indicate the proximity of an object or target when in fact there is no object present. In the past it has required relatively-complex range gating systems to eliminate the signals resulting from self targets.

Still another disadvantage of prior art pulse-doppler systems is that they indicate only the presence of a target, but not the range of the targe from the radar systems.

Therefore, it is an object of the present invention to provide a simple, workable proximity indicating system operating on the pulse-doppler principle.

Still another object of the present invention is to provide a proximity indicating system in which interference from microphonic and other interfering signals is avoided.

Still another object of the invention is to provide a target proximity system in which the effect of self targets on the missile are minimized.

A further object of the present invention is to provide a simple, novel circuit for measuring target range in a pulse-Doppler system.

These and other objects of the invention are achieved by providing a system which takes advantage of the fact that the Doppler signals appear about all the repetition frequency components of the transmitted pulse, and that these frequency components extend to relatively-high frequencies for short duration pulses. A heterodyne mixer is employed for combining a portion of the transmitted signal with the received echo signal. A band-pass amplifier is provided following the mixer which is tuned to the frequency of one of the higher frequency components of the transmitted pulse. Means are provided for controlling the duty cycle of the transmitter so that the amplitude of the component of the transmitted pulse to which the amplifier is tuned is substantially zero. For reasons which will be explained later, the Doppler signals in the vicinity of this component will have an amplitude greater than zero even though the component of the transmitted pulse about which they are centered is zero. The output signal of the band-pass amplifier resulting from the Doppler signals occurring within the pass-band thereof provides an indication of targets in the proximity of the radar system.

For a better understanding of the present invention, together with other and further objects thereof, reference should now be made to the following detailed description which is to be read in conjunction with the accompanying drawings in which.

Figure 1:
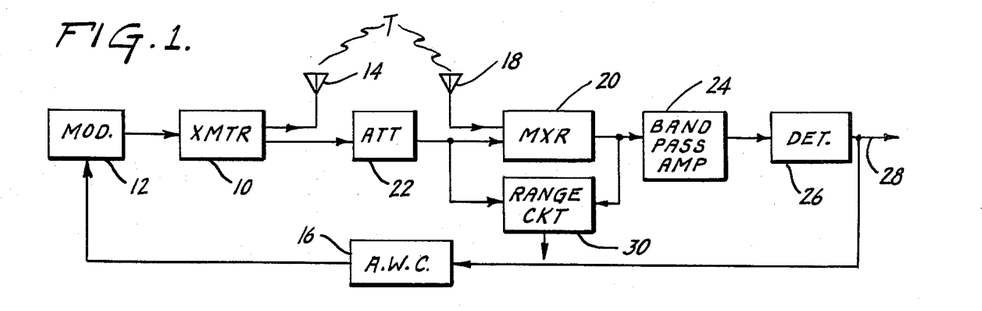
FIG. 1 is a block diagram of a preferred embodiment of the present invention.

Turning now to FIG. 1 the transmitter 10 may be a klystron or magnetron oscillator tube which will produce pulses of microwave frequency energy in response to signals supplied thereto by modulator 12. The generated pulses are supplied to transmitting antenna 14 which radiates energy into space in a selected pattern. The nature of this pattern is not essential to a proper understanding of the operation and/or uses of the present invention. Modulator 12 is a circuit for providing pulses at a precisely controlled repetition rate. The width of the pulses is determined by the selected maximum range of the system. In order that overlap between the transmitted signal and a received target echo signal will not occur until the range to the target is equal to or less than the selected maximum range, the width of the pulses is made equal to twice the time required to propagate a pulse from the transmitting antenna 14 to a preselected maximum range of detection. That is, the pulses have a width equal to the time required to propagate a pulse to this maximum range and to receive back the echo from a target located at that maximum range. For reasons which will be explained in more detail later, modulator 12 is so arranged that the width of the pulse may be varied over a relatively narrow range by a signal supplied thereto from an automatic width control circuit 16.

The receiving portion of the system of FIG. 1 comprises a receiving antenna 18 which is connected to one input of a heterodyne mixer 20. Transmitter 10 is connected to a second input of mixer 20 through attenuator 22. This connection supplies a local oscillator signal to the mixer 20 for the duration of the transmitted pulse. The input of attenuator 22 may be connected directly to the oscillator in transmitter 10 or it may be loosely coupled to the transmission line connecting transmitter 10 to transmitting antenna 14. The physical spacing between antenna 14 and antenna 18 is not critical but it is preferably small with respect to the range to be measured.

The output of heterodyne mixer 20 is connected to the input of a band-pass amplifier 24. For reasons which will be explained in more detail presently bandpass amplifier 24 is so constructed that the center of the passband is at a frequency equal to a harmonic of the pulse repetition frequency, for example, the ninth harmonic of this frequency. Preferably, the amplifier will have a passband approximately equal in width to twice the maximum-expected Doppler frequency (but not greater than the pulse repetition frequency) with good rejection of signals lying outside this passband. That is, the amplifier will pass signals differing from the ninth harmonic of the pulse repetition frequency by up to the maximum-expected Doppler frequency, but will reject all signals differing from the ninth harmonic by more than this amount. The output of band-pass amplifier 24 is connected to the input of a detector circuit 26. Detector 26 is a conventional second detector which supplies a video output signal at output connection 28 in response to the signals supplied by band-pass amplifier 24.

In one embodiment of the invention, the output of detector 26 is connected to the input of automatic width control circuit 16. As indicated above, the output of automatic width control 16 is connected to a control input of modulator 12. It will be shown presently that automatic width control circuit 16 forms a part of a closed loop servo system for maintaining the proper pulse width of the radar system.

A range measuring circuit 30 receives input signals from transmitter 10 via attenuator 22 and from the output of mixer 20. A more detailed explanation of the range measuring circuit 30 is included in connection with the description of FIG. 9.

The operation of the system of FIG. 1 will now be explained with reference to FIGS. 3 to 8.

Figure 3:
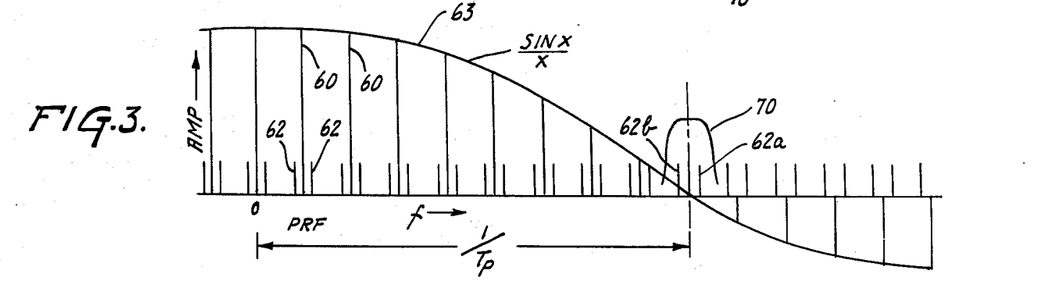
FIG. 3 is a diagram illustrating the frequency components present in the mixer output signal.

FIG. 3 is a plot of the amplitude vs. frequency spectrum at the mixer output of a series of regularly recurring local oscillator pulses and signals which have been reflected from a moving object. It is well known that a regularly recurring series of pulses of constant width can be represented as a plurality of components having frequencies equal to integral multiples of the repetition frequency. These components of the local oscillator pulse are shown at 60 in FIG. 3. The horizontal position of lines 60 in FIG. 3 indicates the frequency of the component represented, and the vertical dimension of the line indicates the amplitude of the represented component. The amplitude of these components very as sin $x/x$ with the first zero crossing of this function being at $1/T_p$ where $T_p$ is the width of the pulses. The negative loop of the sin $x/x$ function merely indicates that the phase of the components of this loop are 180° out of phase at the mid-point of the pulse. As shown in FIG. 3 if $1/T_p$ is made equal to $n$ times the pulse repetition frequency $f_r$, where $n$ is an integer, one of the components of the pulse series will have exactly zero amplitude.

Lines 62 in FIG. 3 represent the Doppler components which are present in the received signal owing to relative movement between the target and the radar system. These components are not present in the transmitted or the local oscillator pulses. The Doppler components 62 are not sidebands of the local oscillator components in the usual sense, but are spaced about each of the components 60 of the local oscillator pulse because each pulse train has the same repetition frequency. The separation of the Doppler component and the adjacent local oscillator component is equal to the Doppler frequency. For reasons which will be explained in detail presently the amplitudes of the Doppler components are not proportional to the amplitude of the component 60 of the local oscillator pulse about which they are centered.

Figure 4:
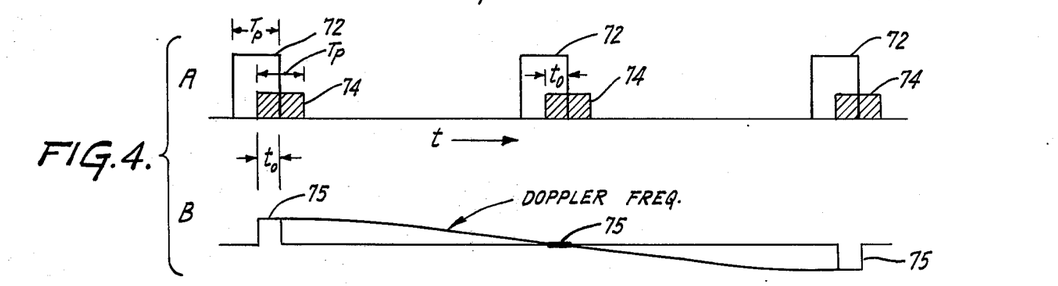
FIG. 4 is a diagram illusrating the effects of target range and motion on the signal at the output of the heterodyne mixer.

FIG. 4A is an amplitude vs. time plot showing the transmitted pulses 72 and the received pulses 74. It has been assumed that the received pulses overlap the transmitted pulses by one-half the pulse width, that is by $T_p/2$. The relative motion of the radar system and the target during one interpulse period will be small compared to the range represented by one pulse width. Hence, the relative motion of the radar system and target will not appreciably change the amount of overlap of the transmitted and received pulses. Mixer 20 will provide an output signal during the entire interval in which a local oscillator signal is supplied by transmitter 10. The amplitude of this envelope in the interval preceding the reception of a target signal is proportional to the amplitude of the local oscillator signal. The amplitude of the envelope during the period of overlap is equal to the vector sum of the received signal and the local oscillator signal. Since the phase of the received signal with respect to the local oscillator signal changes with changes in range, the amplitude of the envelope during the overlap period will vary from pulse to pulse. This variation in amplitude may be represented as a series of rectangular pulses 75 of FIG. 4B which are superimposed on a rectangular envelope resulting from the local oscillator signal alone. It can be shown that pulses 75 undergo a sinusoidal variation in amplitude at the Doppler frequency.

Figure 5:
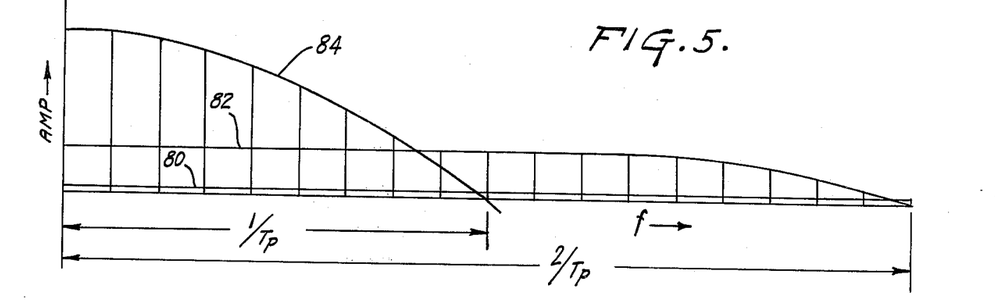
FIG. 5 is an amplitude v. frequency diagram showing the effect on the signal at the output of the mixer of variations in the amount of overlap of the transmitted and received pulses.

The pulses 75 of FIG. 4B can be represented by the spectrum 62 shown in FIG. 3, where the first zero crossing is at $1/t_o$, where $t_o$ is the time of overlap as shown in FIG. 4B. FIG. 5 is a series of waveforms illustrating the change in the spectrum of the overlap pulses as the amount of overlap changes very slowly. FIG. 5 is drawn for a Doppler frequency equal to zero so that the pairs of components 62 of FIG. 3 merge into single components at harmonics of the repetition frequency. At very slight overlap, the overlap pulses have almost zero width and the frequency spectrum is a series of components spaced apart by the pulse repetition frequency and extending from zero almost to infinity as represented by curve 80 of FIG. 5. The total energy contained in the overlap pulses is proportional to the area of the pulses. Since the pulses of almost zero width have very little area but a large number of components, it follows that the amplitude of each component must be small. If the received pulse overlaps the transmitted pulse by one-half the width of the transmitted pulse, the overlap pulses will have a width equal to one-half the width of the transmitted pulse. Therefore the first zero of the overlap pulse spectrum will occur at $2/T_p$ as shown by curve 82 of FIG. 5. Since the area of the overlap pulses has increased and the number of significant components has decreased, each component will have a larger amplitude as represented by the higher initial amplitude of curve 82. When the transmitted pulse and received pulse overlap completely, as they will for a target at zero range, the envelope variation of the components of the overlap pulses will be exactly the same as the envelope variation of the components of the transmitted pulse. That is, the first zero crossing will be $1/T_p$ as shown by curve 84 in FIG. 5.

Returning now to FIG. 3, the Doppler components 62 in FIG. 3 have been drawn for an overlap corresponding to curve 82 of FIG. 5. Curve 70 in FIG. 3 represents the passband of bandpass amplifier 24 of FIG. 1. The center frequency of this passband is located on the first zero crossover point of the sin $x/x$ function for the local oscillator pulses. The Doppler frequencies 62a and 62b are within the passband 70 and hence are passed to detector 26. All other components of the received wave are excluded by the bandpass characteristic 70. Since the amplitudes of components 62 do not go to zero until a frequency equal to $2/T_p$, these components have a substantial amplitude at a frequency equal to $1/T_p$, that is at the center of the passband 70 of FIG. 3. It should now be clear that amplifier 24 of FIG. 1 which has a passband as shown at 70 in FIG. 1 will respond only to components of the overlap pulses, the components of the local oscillator pulses being zero within the passband. Microphonics in the system will result in changes in amplitude of the local oscillator signal from pulse to pulse. The microphonic signals will appear as true sidebands about each of the components of the local oscillator signal. These microphonic sideband components have an amplitude proportional to the component of local oscillator signal about which they are centered. Therefore the microphonic signals will have zero amplitude within the passband 70.

Figure 6:
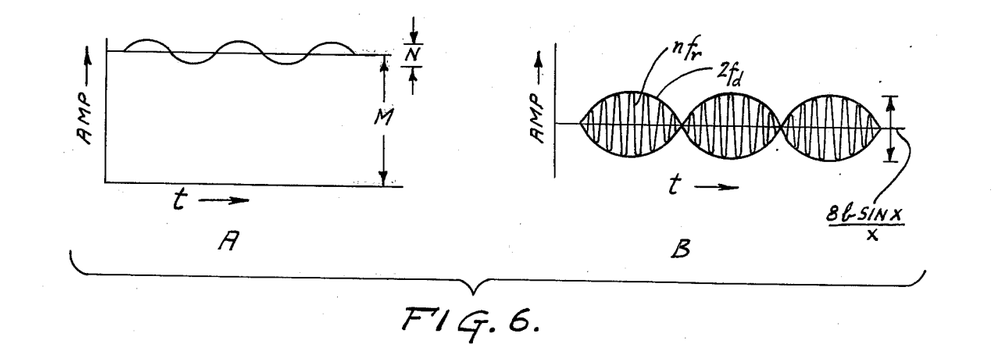
FIG. 6 is a diagram which illustrates the manner in which the effects of microphonic signals are avoided in the circuit of the present invention.

The advantages of the system shown in FIG. 1 over the prior art systems are illustrated by FIG. 6. FIG. 6A is a plot of amplitude vs. time for the zero-frequency component of the local oscillator pulse and the adjacent Doppler components. The amplitude of the d.c. component M of FIG. 6A is proportional to the amplitude of the transmitted pulse. The peak-to-peak amplitude N of the Doppler signal voltage is equal to four times the amplitude $b$ of the lowest frequency Doppler component. Since the value N is smaller compared to value M and is at audio frequencies, any microphonics in an audio amplifier or any variations in the power supply system would cause ripples on d.c. level M which might well equal or exceed the amplitude of the desired signal N. FIG. 6B is an amplitude vs. time plot of the signal at the output of amplifier 24 of the present invention. Since the amplitude of the component of the local oscillator signal is zero at the center of passband 70, the output signal from amplifier 24 will have the appearance of a suppressed carrier wave. The peak-to-peak amplitude of this wave will be equal to $8b$ sin $x/x$. The frequency of this signal will be euql to $1/T_p$, or more correctly $1/nf_r$, where $f_r$ is the pulse repetition frequency. The envelope of this wave has a frequency $2f_d$. This envelope is not affected by microphonics in the amplifier.

Figure 7:
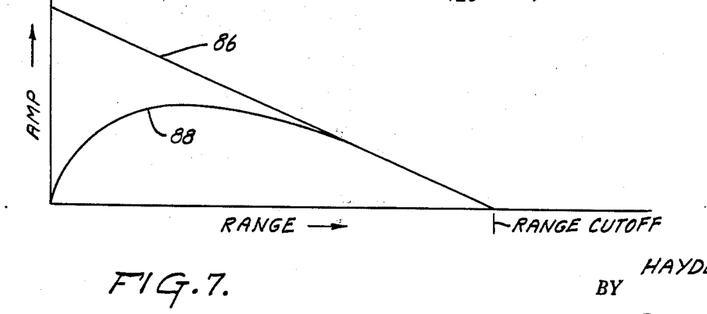
FIG. 7 is a diagram illustrating the variation in output signal amplitude as a function of range for the embodiment of FIG. 1.

The above discussion has assumed a substantially constant overlap. The effect of a change in the amount of overlap of the local oscillator pulses and the received pulses will now be explained. As the overlap increases from the amount represented by curve 82 of FIG. 5 to the amount represented by the curve 84, the zero point of the envelope of the Doppler components 62 of FIG. 3 will move in towards the center of passband 70. Therefore the amplitude of the signal at the output of mixer 24 of FIG. 1 will vary as shown in FIG. 7. The point marked "range cut off" in FIG. 7 is the point at which the target echo just begins to overlap the local oscillator pulses. For targets beyond this range there is no overlap between the local oscillator pulses and the received pulses, and hence no target components in the output of mixer 20. As the relative spacing between the target and the radar system decreases, the amplitudes of the target components in the output of mixer 20 starts to rise along the straight line 86. That is because the area under the overlap pulses increases substantially linearly with the change in the amount of overlap. However, as the amount of overlap increases, the zero point in the sin $x/x$ function for the overlap pulses approaches the center of the passband of amplifier 24. At very small ranges the decrease in amplitude of the target components owing to the movement of the zero of this function toward the center of the passband causes the amplitude of the target components within the passband to decrease more rapidly than they increase due to the increased area of the overlap pulses. For this reason the output of amplifier 24, which is represented by curve 88 of FIG. 7, increases to a maximum and then decreases to zero at zero range. As mentioned earlier, this characteristic of the system is a distinct advantage since it eliminates the effect of targets at very short range, such as self-targets, on the radar system itself.

As mentioned above the narrow band amplifier 24 passes only two components of the spectrum of the received signal which represent only a small fraction of the total energy of the received signal. If the amplitude of the received signal component at the output of the bandpass amplifier 24 is to be large compared to the signal component of the local oscillator signal and the microphonic sideband components thereof, the amplitude of the local oscillator signal component at the output of amplifier 24 must be maintained at a low amplitude, ideally zero. This desired relationship is maintained by maintaining the zero crossing of the local oscillator sin $x/x$ function at the frequency of the local oscillator component lying within the passband 70. In the system of the present invention, the zero crossing of the local oscillator sin $x/x$ function is maintained at the desired frequency by control of the width of the transmitted pulse. This control is effected by the automatic width control circuit 16 the operation of which can now be explained.

Figure 2:
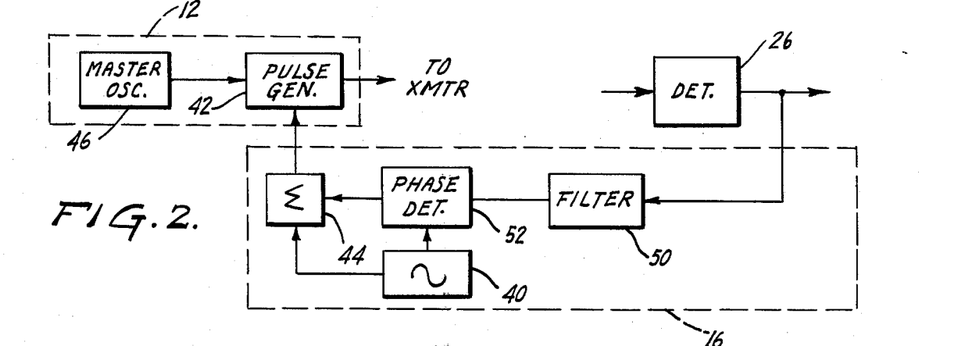
FIG. 2 is a more detailed block diagram of the pulse width control portion of the system of FIG. 1.

FIG. 2 is a more detailed block diagram of automatic width control circuit 16 and modulator 12 of FIG. 1. As shown in FIG. 2, source 40 in automatic width control circuit 16 supplies a low-frequency jitter signal to pulse generator 42 in modulator 12 by way of a signal combining circuit 44. By way of example, pulse generator 42 may be a phantastron delay circuit, a single-shot multivibrator circuit or a blocking oscillator circuit in which the pulse width is dependent upon the potential supplied by signal combining circuit 44. At higher pulse repetition frequencies, for example frequencies of a megacycle or higher, pulse generator may be a ringing circuit and suitable means associated therewith for forming pulses from the oscillatory signal generated by the ringing circuit. Controllable pulse width generators of these types are well known in the art and therefore the will not be described in detail. A master oscillator 46 is provided for maintaining a fixed repetition rate for pulse generator 42. Master oscillator 46 may be any stable oscillator circuit, for example, a crystal oscillator circuit. If pulse generator 42 is a circuit having good stability of repetition rate, master oscillator 46 may be omitted. The output of detector 26 of FIG. 1 is connected to the automatic width control circuit 16. For reasons which will be explained in detail presently, detector 26 provides a signal which has a component at the frequency of the signal originally supplied by source 40. It will be shown that the amplitude and phase of this component are dependent upon the deviation from a desired value of the width of the pulse supplied by pulse generator 42. The signal at the output of detector 26 is supplied through a filter 50 to one input of a phase detector 52. Filter 50 passes the component at the frequency of the signal supplied by source 40 but rejects other signals. A reference signal from source 40 is supplied to a second input of phase detector 52. This reference signal is related in phase to the signal supplied to combining circuit 44 by source 40. Phase detector 52 is a circuit which provides a d-c output signal which is indicative of the relative phases of the signals supplied to its two inputs. Phase detectors for performing this function are well known in the art and need not be described in detail. The output of phase detector 52 is connected to a second input of signal combining circuit 44. Signal combining network 44 may be a simple coupling network which combines the d.c. signal from phase detector 52 and the a.c. signal from source 40 and supplies these two signals to the input of pulse generator 42. The signal supplied by source 40 to pulse generator 42 causes the width of the pulse supplied by generator 52 to vary at a relatively low rate, for example, 1 kilocycle per second. The signal supplied by source 40 may have a sinusoidal variation with time which produces a corresponding variation in the width of the pulse. This variation in the pulse width causes a corresponding variation in the zero crossing point of the sin $x/x$ function.

Figure 8:
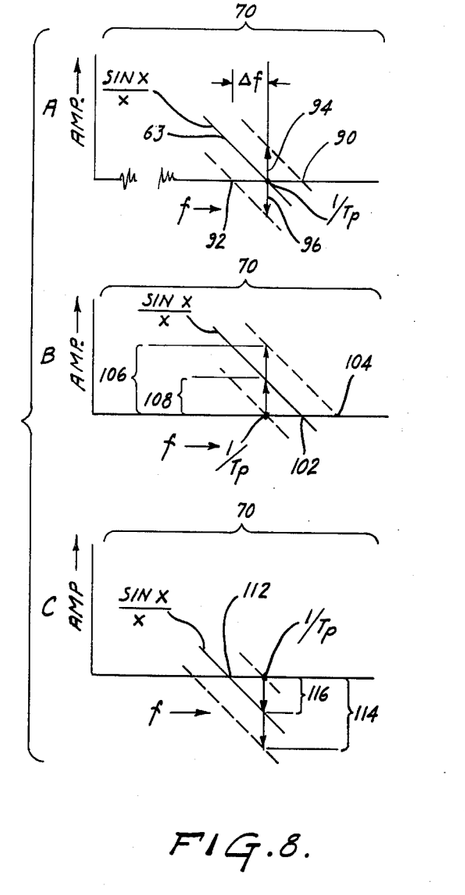
FIG. 8 is a series of diagrams illustrating the operation of the automatic width control circuit of FIG. 1.

FIG. 8 shows the effect of this sinusodial variation in pulse width on the output of band-pass amplifier 24. FIG. 8 corresponds to the region of FIG. 3 in the vicinity of zero crossing of the sin $x/x$ function of the local oscillator pulses. If the signal supplied by source 40 decreases the width of the pulse on the negative half cycle of the signal from source 40, the zero crossing point of function 63 will take place at point 90 which is higher in frequency than $nf_r$. If on the positive half cycle of signal from source 40, the pulses are increased in width, the zero crossing will take place at point 92 which is lower in frequency than $nf_r$. With a crossing at point 90 the component of the local oscillator pulse at frequency $nf_r$ will have an amplitude of positive phase as indicated by arrow 94. If the crossing is at point 92 the component at frequency $nf_r$ will have an amplitude of negative phase as represented by the arrow 96 of FIG. 8A. Thus, with symmetrical operation about point $1/nf_r$, the local oscillator component in the output of amplifier 24 will resemble a double-sideband suppressed-carrier component of the frequency $nf_r$ modulated by the signal from source 40. It is well known that if a suppressed carrier signal is applied to a conventional diode detector, the signal at the output of the detector will include a component at twice the frequency of the original modulating signal, but no component at the fundamental frequency. Therefore, if the average width $T_p$ of the pulse supplied by generator 42 is such that the zero crossing normally would take place at a frequency $nf_r$, the signal supplied by amplifier 24 to detector 26 would produce a double-frequency signal at the output of detector 26. However, no signal at the frequency of source 40 will appear at the output of detector 26. Filter 50 is tuned to the frequency of source 40. Hence it will not pass the double-frequency components supplied by detector 26. If filter 50 has no output signal, the phase detector 52 will have no output, and no correction signal will be supplied to pulse generator 42 from this circuit.

Suppose now that the average value of the pulse supplied by pulse generator 42 is such that the zero crossing point of the sin $x/x$ function takes place at point 102 of FIG. 8B. Point 102 is located at a higher frequency than $nf_r$. Suppose that the sinusoidal signal from source 40 swings the zero crossing point from point $nf_r$ to a higher frequency at point 104. In this case the component of the local oscillator pulse at frequency $nf_r$ will vary in amplitude from zero to a maximum amplitude 106. The average value will be shown by bracket 108 in FIG. 8B. The signal at the output of amplifier 24 for the situation described in connection with FIG. 8B will be 100 percent modulated with the carrier signal of frequency $nf_r$ present. Therefore the output of detector 26 will be a sinusoidal signal at the frequency of source 40. This signal will be either in phase or 180° out of phase with the signal from source 40. The output of phase detector 52 in response to the signal supplied by source 40 and filter 50 is such as to increase the average width of the pulse supplied by generator 42 and therefore move the average zero crossing point to a lower frequency, that is, to the desired point $nf_r$ in FIG. 8B.

FIG. 8C illustrates the signals present at the output of amplifier 24 if the average width of the pulse supplied by generator 42 is such as to cause the zero crossing of the sin $x/x$ function to occur at a point 112 which is lower in frequency than frequency $nf_r$. In the example shown in FIG. 8C the amplitude of the component of frequency $nf_r$ will again vary from zero to a value 114 with an average value as indicated by the bracket 116. This signal will again result in a signal at the frequency of source 40. However, the signal produced by the condition shown in FIG. 8C is 180° out of phase with the signal produced by the condition illustrated in FIG. 8B. Therefore phase detector 52 will provide a signal which will tend to decrease the width of the pulse supplied by generator 42 and move the zero crossing back to the frequency $nf_r$. Only three extreme conditions have been shown in FIG. 8. If the zero crossing occurs somewhere between the points shown in FIG. 8A and FIG. 8B, both the double frequency component and the fundamental component will be present in the output of detector 48. The double frequency component will have no effect on phase detector 52 but the fundamental component will cause phase detector 52 to have an output which will tend to correct the width of the pulses produced by pulse generator 42. The magnitude of the variation in pulse width provided by the signal from source 40 will depend upon the gain of the servo loop of which the automatic pulse width circuit 16 forms a part. The constants of this servo loop should be so chosen that the maximum amplitude of the local oscillator signal appearing at the output of amplifier 24 is a small fraction of the amplitude of the expected target signal components within the passband 70 of amplifier 24. Preferably, the frequency of source 40 is chosen to have a relatively low value so that the modulating signal may be separated from low-frequency target signals after detector 26.

Figure 2A:
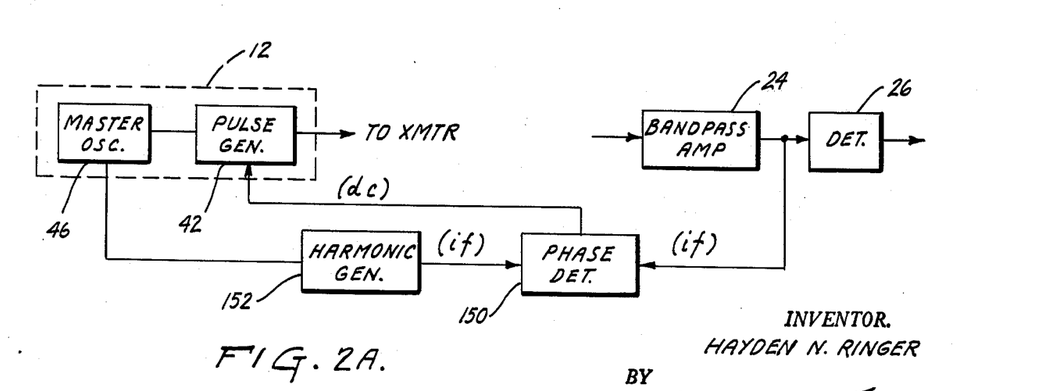
FIG. 2A is a block diagram of a second pulse width control circuit which may be employed in the system of FIG. 1.

FIG. 2A is a block diagram of a second form of automatic width control circuit. Blocks 24, 26 42 and 46 in FIG. 2A correspond to similarly numbered blocks in FIGS. 1 and 2. The circuit of FIG. 2A employs a phase detector 150 which has one input connected to the output of bandpass amplifier 24 and a second input connected to the output of a harmonic generator 152. Harmonic generator 152 is a circuit which receives a signal at the pulse repetition frequency $f_r$ from master oscillator 46 and provides an output signal at the harmonic of the repetition frequency $nf_r$ which lies within the passband of amplifier 24. Phase detector 150 compares the phase of the harmonic of the pulse repetition frequency $nf_r$, if present, at the output of amplifier 24, with the phase of the reference signal $nf_r$ from harmonic generator 152 and supplies a d.c. signal to pulse generator 42 which is indicative of the phase and amplutide of the signal at the output of bandpass amplifier 24. This d.c. signal controls the width of the pulses generated by pulse generator 42 as explained in connection with the description of FIG. 2.

The circuit of FIG. 2A does not rely on a low frequency modulation or jitter of the pulse width to develop an error signal. Instead use is made of the fact that the phase of the harmonics of the repetition frequency which are present in the received signal have one phase at frequencies lower than the first zero in the sin $x/x$ function and the opposite phase for frequencies immediately above the first zero. As explained in connection with the description of FIGS. 1 and 2, if the width of the pulse supplied by pulse generator 42 of modulator 12 is such that the zero crossing of the sin $x/x$ function occurs in coincidence with the harmonic of the repetition frequency to which amplifier 26 is tuned, then no signal will be supplied by amplfier 24 to phase detector 150. However, if the pulse width is other than this desired value a signal will be supplied to phase detector 150, the phase of this signal will be indicative of the direction of the deviation in the pulse width from the desired value and the amplitude of the signal is proportional to the ampliitude of the deviation in pulse width.

The system thus far described provides an indication that a target is present at a range less than the selected maximum range. It would be possible to ascertain the range to the target producing the echo signal by measuring directly the amount of overlap to the transmitted and received pulses. However, known forms of pulse width measuring circuits capable of measuring the duration of the extremely short pulses which are present in short range proximity indicating systems are far too complex to be practical in small, light-weight systems.

Figure 9:
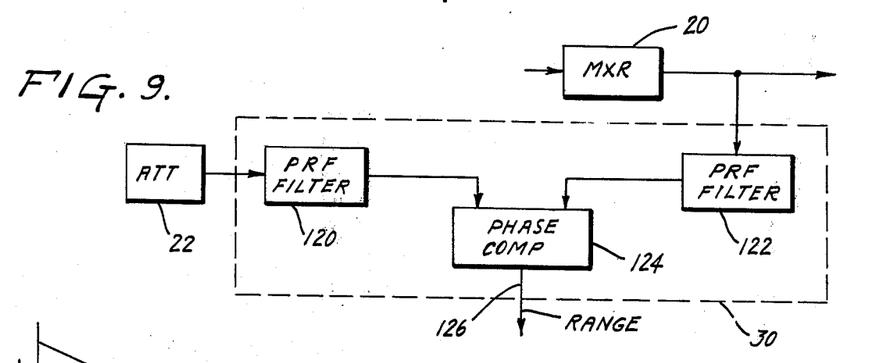
FIG. 9 is a more detailed block diagram of a second portion of FIG. 1.

The circuit shown in FIG. 9 will provide the desired range information, and will avoid the unwanted complexity of prior art systems. The broken ractangle 30 of FIG. 9 represents the range circuit 30 of FIG. 1. As shown in FIGS. 1 and 9, range circuit 30 receives one input signal from attenuator 22 and a second input signal from mixer 20. As shown in FIG. 9, connections are made from attenuator 22 and mixer 20, respectively, to the inputs to narrow band filters 120 and 122. Filters 120 and 122 are so constructed that they both pass the same signal frequency. This frequency is equal to the repetition frequency $f_r$ of the system, or some integral multiple of this frequency.

The output circuits of filters 120 and 122 are connected to separate input circuits of a phase comparison circuit 124. Phase comparison circuit 124 may be any of a number of well know circuits which will provide at output lead 126 a signal which is representative of the difference in phase of the signals supplied to the two inputs of circuit 124. Circuit 124 differs from phase detectors 52 and 150 in that it provides an output signal which is a continuous indication of the phase difference of the two signals supplied thereto. Circuits 52 and 150 need only respond to signals which are either in phase or 180° out of phase. It will now be shown that the signal at the output circuit 126 of phase comparison circuit 124 is representative of the range from the proximity indicating system to the object returning an echo signal.

Figure 10:
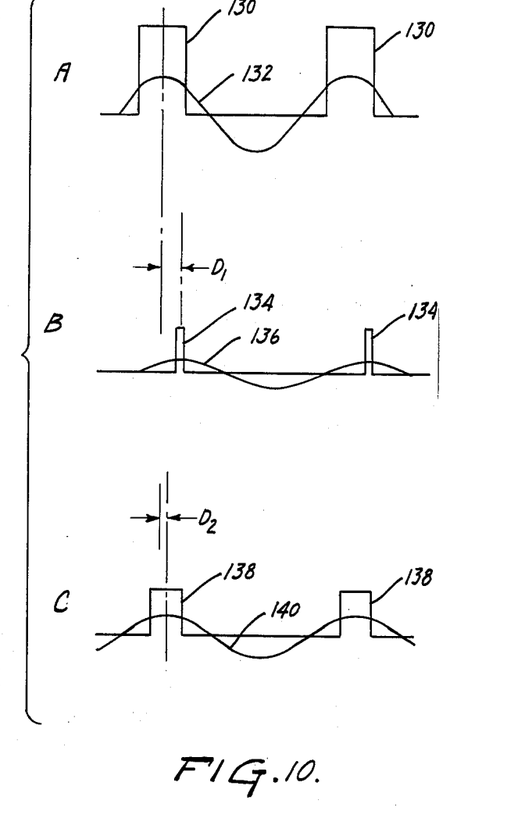
FIG. 10 is a series of curves illustrating the operation of the range measuring portion of the system of FIG. 1.

In FIG. 10A pulses 130 represent the envelope of the local oscillator pulses. Curve 132 of FIG. 10A represents the fundamental component of pulse 130. The amplitude of the component 132 will depend upon the amplitude and the duty cycle of the pulse but the phase of this component is fixed with respect to the pulse. That is, the positive peak of component 132 always occurs at the center of the rectangular pulse. Fundamental component 132 can be extracted from envelope 130 by a narrow band filter such as filter 120 of FIG. 9. If attenuator 22 supplies filter 120 with the radio frequency pulse rather than merely the envelope 130, filter 120 may include a suitable diode detector for deriving the envelope 130 of the pulse before filtering.

Pulses 134 of FIG. 10B represent the overlap pulses which would occur at the output of mixer 20 for a target at the extreme range of detection. Pulses 134 have the same repetition frequency as pulses 130 hence the fundamental component 136 of pulses 134 will have the same frequency as component 132 of pulses 130. However, pulses 134 occur at the trailing edges of pulses 130. Therefore the phase of component 136 will be displaced by an amount $D_1$ from the phase of component 132.

As the range to the object causing reflection decreases the width of the overlap pulses will increase as shown at 138 in FIG. 10C. As the width of the overlap pulses increases the center of the overlap pulses will approach the center of pulses 30. Therefore the phase of the fundamental component of the overlap pulses will approach the phase of component 132. As shown in FIG. 10C the phase of component 140 representing a target at medium range differs by only the amount $D_2$ from the phase of component 132 rather than by the greater amount $D_1$ of FIG. 10B. It should be apparent from the foregoing discussion that the phase difference is zero at zero range and increases linearly as the range increases.

The phase relationship mentioned above holds true not only for the fundamental components $f_r$ of the local oscillator pulse and the overlap pulses but for all components of these pulses which have frequencies below the first zero of the sin $x/x$ function. It can be shown that if the frequency of the $n^{th}$ harmonic of the local oscillator signal is at the frequency of the first zero of the sin $x/x$ function, then the phase of the $n^{th}$ harmonic of the overlap pulse will change by one complete cycle as the target moves from maximum detected range to zero range. Therefore it is preferable that filters 120 and 122 be tuned to the frequency $nf_r$ for three reasons. First, the range sensitivity of the system, that is the phase change for a given change in range, is maximum under these conditions; secondly the only signals appearing at the output of mixer 20 at this frequency are the components 62 of the overlap pulses; and finally, the operation of the system is not dependent on any Doppler shift in the frequency of the components of the overlap pulses, and, as a result, the range to targets having no relative motion with respect to the system may be measured. Filters 120 and 122 may be tuned to any harmonic of the two pulses lower than $nf_r$ provided the passband of filter 122 rejects the components 60 of the local oscillator pulse. Thus filter 122 may have a passband similar to passband 70 of FIG. 3 but with the center frequency at any one of the harmonics 60 of FIG. 3. The passband of filter 122 would further differ from passband 70 in that it would have a sharp notch at the center to reject the component 60 on which it is centered. It will be remembered that the components 62 shown in FIG. 3 which are the components of the overlap pulses are displaced from components 60 by the Doppler shift frequency which results from target motion relative to the system. Thus if the passband of filter 122 is provided with a notch at the center no signal will be passed by filter 122 unless the target has a component of motion toward or away from the system. This arrangement may be advantageous under the circumstances.

Regardless of the harmonics chosen to energize phase comparator 124 this circuit will provide an output signal which is proportional to the phase difference of the signals supplied to the two inputs thereof. Therefore the signal appearing at the output lead 126 of FIG. 9 which represents the phase difference of the two components 130 and 134 or 140 is a direct function of the range to the target.

A circuit of the type shown in FIG. 2A may be employed to measure range. The harmonic generator 152 replaces filter 120 of FIG. 9 as the source of signal of reference phase. The bandpass characteristic of amplifier 24 permits the elimination of filter 122. Phase detector 150 of FIG. 2A must be replaced or supplemented by a phase comparison circuit. As will now be apparent, care must be taken in the use of the circuit of FIG. 2A to prevent the Doppler components 62 from influencing the pulse width control loop and equal care must be taken to prevent the components of the local oscillator signal from influencing the output of the phase comparator circuit which provides range information. This can be accomplished by the use of appropriate narrow band filters since, for all targets moving relative to the system, the components 62 are separated from components 60 by the Doppler shift frequency. Amplitude discrimination may be employed in addition to or in place of frequency discrimination since, as mentioned above, if the system of FIG. 1 is operating properly, the component 60 which is at $nf_r$ has an amplitude which is much lower than that of the components 62 which are centered on frequency $nf_r$.

While the invention has been described with reference to certain preferred embodiments thereof, it will be apparent that various modifications and other embodiments thereof will occur to those skilled in the art within the scope of the invention. Accordingly I desire the scope of my invention to be limited only by the appended claims.

I claim:

1. A radar detection system comprising means for generating time spaced pulses of high frequency energy, said pulses having a width equal to $a/nf_r$, where $a$ and $n$ are integers and $f_r$ is the pulse repetition frequency, means for projecting said energy pulses into space, receiver means for receiving target reflected echoes of said projected pulses, said receiver means including a heterodyne mixer, a bandpass circuit connected to the output of said heterodyne mixer, and means for supplying received echo signals to said mixer, means for supplying pulses corresponding to said generated pulses in pulse repetition frequency, pulse width and frequency to said heterodyne mixer as a local oscillator signal, said bandpass circuit having a passband centered at the frequency $nf_r$, the width of said passband being not greater than $f_r$.

2. A radar detection system comprising means for generator time spaced pulses of high frequency energy, said pulses having a width equal to $1/nf_r$, where $n$ is an integer, and $f_r$ is the pulse repetition frequency, means for projecting said energy pulses into space, receiver means for receiving target reflected echoes of said projected pulses, said receiver means including a heterodyne mixer, a bandpass circuit connected to the output of said heterodyne mixer, and means for supplying received echo signals to said mixer, means for supplying said generator pulses to said heterodyne mixer as a local oscillator signal, said bandpass circuit having at least one passband, each passband being an integral multiple including the first of the frequency $nf_r$, the width of each passband being not greater than $f_r$.

3. A radar detection system comprising means for generating time spaced pulses of high frequency energy, said pulses recurring at the frequency $f_r$, means for projecting said energy pulses into space, receiver means for receiving target reflected echoes of said projected pulses, said receiver means including a heterodyne mixer and a bandpass circuit connected in cascade and means for supplying received echo signals to said mixer, means for supplying pulses corresponding to said generated pulses in pulse repetition frequency, pulse width and frequency to said heterodyne mixer as a local oscillator signal, said bandpass circuit having a passband centered at the frequency $nf_r$, where $n$ is an integer, the width of said passband being not greater than $f_r$, and means connected to said pulse generator means and to said receiver means at a point following said mixer for maintaining the width of said generated pulses at the value $a/nf_r$, where $a$ is an integer.

4. A radar detection system comprising means for generating time spaced pulses of high frequency energy, said pulses recurring at the frequency $f_r$, means for projecting said energy pulses into space, receiver means for receiving target reflected echoes of said projected pulses, said receiver means including a heterodyne mixer and a bandpass circuit connected in cascade and means for supplying received echo pulses to said mixer, means for supplying said generated pulses to said mixer as a local oscillator signal, said bandpass circuit having a passband centered at the frequency $nf_r$, when $n$ is an integer, the width of said passband being not greater than $f_r$, and means connected to said pulse generator means and to said receiver means at a point following said mixer for maintaining the width of said generated pulses at the value $1/nf_r$.

5. A radar detection system comprising means for generating time spaced pulses of high frequency energy, said pulses having a width equal to $1/nf_r$, where $n$ is an integer, and $f_r$ is the pulse repetition frequency, means for projecting said energy pulses into space, receiver means including a heterodyne mixer, a bandpass circuit connected to the output of said heterodyne mixer, and means for supplying received echo signals to said mixer, means for supplying said generated pulses to said heterodyne mixer as a local oscillator signal, said bandpass circuit having a single passband centered at the frequency $nf_r$, the width of said passband being not greater than $f_r$, and means for comparing the phase of the component of said signals in the output of said bandpass circuit with the component $nf_r$ of said generated pulses thereby to provide an indication of the range to the target reflecting said echo pulses.

6. An object proximity indicating system comprising a transmitting antenna for projecting signals into space in a predetermined pattern, a receiving antenna for receiving echoes of said projected pulses reflected from objects within said pattern, the spacing between said antennas being small compared to the distance between said object and said system at which detection occurs, means for generating time spaced pulses of high frequency energy, said pulses recurring at the frequency $f_r$, means connecting the output of said generating means to said transmitting antenna, a receiver means including a heterodyne mixer and a bandpass circuit connected in cascade, said mixer having a signal input and a local oscillator input means connecting said signal input of said mixer to said receiving antenna, means connecting said local oscillator input of said mixer to the output of said pulse generating means, said bandpass circuit having a passband centered at the frequency $nf_r$, where $n$ is an integer, the width of said passband being not greater than $f_r$, and means connected to said pulse generator and to said receiver means at a point following said mixer for maintaining the width of said generated pulses at the value $1/nf_r$.

7. An object proximity indicating system comprising a transmitting antenna for projecting signals into space in a predetermined pattern, a receiving antenna for receiving echoes of said projected pulses reflected from objects within said pattern, the spacing between said antennas being small compared to the distance between said object and said system at which detection is to occur, means for generating time spaced pulses of high frequency energy, said pulses recurring at the frequency $f_r$, means connecting the output of said generating means to said transmitting antenna, a receiver means including a heterodyne mixer and a bandpass circuit connected in cascade, said mixer having a signal input and a local oscillator input, said bandpass circuit having a passband center at the frequency $nf_r$, where $n$ is an integer, the width of said passband being not greater than $f_r$, means connecting said signal input of said mixer to said receiving antenna, means connecting said local oscillator input of said mixer to the output of said pulse generating means, and an automatic width control circuit connected to said pulse generating means and to said receiver means at a point following said bandpass circuit, said automatic width control circuit being responsive to the phase of the signal at frequency $nf_r$ at the output of said bandpass circuit for controlling the width of said generated pulses, thereby to maintain the signal at frequency $nf_r$ at minimum amplitude.

8. An object proximity indicating system comprising a transmitting antenna for projecting signals into space in a predetermined pattern, a receiving antenna for receiving echoes of said projected pulses reflected from objects within said pattern, the spacing between said antennas being small compared to the distance between said object and said system at which detection occurs, means for generating time spaced pulses of high frequency energy, said pulses recurring at a frequency $f_r$, the width of said pulses being determined by the characteristics of selected signals supplied to said pulse generating means, means connecting the output of said generating means to said transmitting antenna, a receiver means including a heterodyne mixer, a bandpass amplifier, and a detector connected in cascade, said mixer being provided with a signal input and a local oscillator input, said bandpass amplifier having a passband centered at the frequency $nf_r$, where $n$ is an integer, the width of said passband being not greater than $f_r$, means connecting the signal input of said mixer to said receiving antenna, means connecting the local oscillator input of said mixer to the output of said pulse generating means, an automatic width control circuit connected between the output of said detector and said pulse generator means, said automatic width control circuit comprising a source of periodic signal connected to said pulse generating means for modulating the width of said pulses, filter means connected to the output of said detector, said filter means having a narrow passband centered at the frequency of said last-mentioned signal source, phase detector means having first and second inputs connected to said source of periodic signal and to said filter means, respectively, said phase detector means providing an output signal indicative of the relative phases of the signals supplied by said periodic source and said filter, and means connecting the output of said phase detector means to said pulse generating means to control the width of said generated pulses.

9. A system for generating pulses having a repetition frequency $f_r$ and a pulse width equal to $1/nf_r$ where $n$ is an integer, said system comprising a pulse generator circuit for providing pulses at a repetition rate $f_r$, said generator circuit being responsive to a potential supplied to a control input thereof to vary the width of the pulses generated thereby, a signal adder circuit having first and second inputs and an output, means connecting the output of said signal adder circuit to said control input of said pulse generator circuit, a source of oscillatory signals having a frequency low compared to $f_r$, said source being connected to said first input of said signal adder, thereby to produce a modulation in the width of said pulses at the frequency of said oscillatory signal, a bandpass circuit coupled to the output of said pulse generator circuit, said bandpass circuit having a passband centered at the frequency $nf_r$, the frequency width of said passband being not greater than $f_r$, means coupled to the output of said bandpass circuit for detecting the modulation at the frequency of said oscillatory signal present on the signal passed by said bandpass circuit, and phase detector means connected to said source of oscillatory signal and said modulation detection means, said phase detector providing an output signal having a polarity dependent upon the phase of said detected modulation relative to said oscillatory signal, and an amplitude indicative of the amplitude of said detected modulation, the output of said phase detector means being connected to said second input of said signal adder means.

10. A system for detecting in a signal which includes as a component thereof a periodic series of pulses of repetition frequency $f_r$ and pulse width $b$, the presence of a simultaneously occurring series of pulses of repetition frequency $f_r$ and pulse width $a$, where $b$ is different from $a$ and is equal to $1/nf_r$, where $n$ is an integer, said system comprising a bandpass circuit having at least one passband, each passband being centered at an integral multiple including the first of the frequency $nf_r$, each passband having a frequency width not greater than $f_r$, means for supplying said signal to said bandpass circuit, and detecting means connected to the output of said bandpass circuit for detecting signals passed by said bandpass circuit.

11. An object proximity indicating system comprising a transmitting antenna for projecting signals into space in a predetermined pattern, a receiving antenna for receiving echoes of said projected pulses reflected from objects within said pattern, the spacing between said antennas being small compared to the distance between said object and said system at which detection occurs, means for generating time spaced pulses of high frequency energy, said pulses recurring at a frequency $f_r$, the width of said pulses being determined by the characteristic of a selected signal supplied to a first input of said pulse generating means, means connecting the output of said pulse generating means to said transmitting antenna, a receiver means including a heterodyne mixer, a bandpass circuit, and a detector connected in cascade, said mixer being provided with a signal input and a local oscillator input, said bandpass circuit having a passband centered at the frequency $nf_r$, where $n$ is an integer, the width of said passband being not greater than $f_r$, means connecting the signal input of said mixer to said receiving antenna, means connecting the local oscillator input of said mixer to the output of said pulse generating means, an automatic width control circuit connected between the output of said detector and said pulse generator means, said automatic width conrol circuit comprising a harmonic generator circuit having its input circuit connected to an output of said pulse generator means, a phase detector circuit having first and second inputs and an output, said phase detector circuit providing at said output a signal having a selected characteristic which is indicative of the relative phases of signals supplied to the two inputs thereof, said first input of said phase detector circuit being coupled to the output of said harmonic generator, said second input of phase detector circuit being coupled to the output of said bandpass circuit, and said output of said phase detector being coupled to said first input of said pulse generating means.

12. A system for detecting variations in the pulse width of a periodic series of pulses having an average pulse width approximately equal to $1/nf_r$, where $f_r$ is the repetition frequency of said pulses and $n$ is an integer, said system comprising a bandpass circuit having a single passband centered at the frequency equal to $1/T_p$, where $T_p$ is the average time width of said pulses, said passband having a frequency width not greater than $f_r$, means for supplying said series of pulses to the input of said bandpass circuit, a source of an oscillatory reference signal, means responsive to said oscillatory reference signal for causing the width of said pulses to vary about said average value at the frequency of said oscillatory reference signal, a phase detector circuit having a first input coupled to the output of said bandpass circuit at the frequency of said reference signal, means for supplying said reference signal to a second input of said phase detector circuit, said phase detector circuit providing an output signal which is indicative of the relative phases of the signal supplied to the two inputs thereof, said output signal of saiid phase detector being indicative of the difference between the average width of said pulses and $1/nf_r$.

13. A system for detecting variations in the pulse width of a periodic series of pulses having an average width approximately equal to $1/nf_r$, where $f_r$ is the repetition frequency of said pulses and $n$ is an integer, said system comprising a bandpass circuit having a single passband centered at the frequency equal to $1/T_p$, where $T_p$ is the average time width of said pulses, said passband having a frequency width not greater than $f_r$, means for supplying said series of pulses to the input of said bandpass circuit, means for generating a signal having a frequency $nf_r$ and a preselected fixed phase, a phase detector circuit having one input coupled to the output of said bandpass circuit, means for supplying said reference signal to a second input of said phase detector circuit, said phase detector circuit providing an output signal which is indicative of the relative phases of the signals supplied to the two inputs thereof, said output signal of said phase detector being indicative of the difference between the average width of said pulses and $1/nf_r$.

14. A system for detecting in a composite signal which includes as one component thereof a periodic series of pulses of repetition frequency $f_r$ and a pulse width $b$, the presence of a second component comprising a simultaneously occurring series of pulses of repetition frequency $f_r$ and pulse width $a$, where $b$ is different from $a$ and is equal to $1/nf_r$, where $n$ is an integer, said system comprising filtering means which passes only signal components having frequencies within the range $nf_r+f_r/2$ and $nf_r-f_r/2$, means for supplying said composite signal to the input of said filtering means, and means for detectiing the signals passed by said filtering means.

15. In conjunction with a system which provides a first series of pulses having a pulse repetition frequency $f_r$ and a pulse width $a$ and a second periodic series of pulses having a pulse repetition rate $nf_r$, where $n$ is an integer greater than one, and a pulse width $b$, means for measuring the difference in said pulse widths $a$ and $b$ comprising means for phasing said two series of pulses so that one edge of each pulse in said first series is in time coincidence with one edge of a pulse in said second series, means for extracting the component $mf_r$ from each series where $m$ is an integral multiple of $n$ and means for measuring the phase difference of said two extracted components.

16. In conjunction with a system which provides a first periodic series of pulses having a pulse repetition frequency $f_r$ and a pulse width $a$, and a second periodic series of pulses having the same pulse repetition rate $f_r$ and a pulse width $b$, means for measuring the difference in said pulse widths, said means comprising means for phasing said series of pulses so that one edge of each pulse in one series is in time coincidence with one edge of a pulse in the other series, means for extracting the component $mf_r$ from each series, where $m$ is an integer, and means for measuring the phase difference of said two extracted components.

17. A radar detection system comprising means for generating time spaced pulses of high frequency energy, said pulses having a width equal to $a/nf_r$, where $a$ and $n$ are integers and $f_r$ is the pulse repetition frequency, means for projecting said energy pulses into space, receiver means for receiving target refelected echoes of said projected pulses, said receiver means including a heterodyne mixer, a bandpass circuit connected to the output of said heterodyne mixer, and means for supplying received echo signals to said mixer, means for supplying pulses corresponding to said generated pulses in pulse repetition frequency, pulse width and frequency to said heterodyne mixer as a local oscillator signal, said bandpass circuit having a single passband centered at the frequency $nf_r$, the width of said passband being not greater than $f_r$.

18. A radar detection system comprising means for generating time spaced pulses of high frequency energy, said pulses having a width equal to $1/nf_r$, where $n$ is an integer, and $f_r$ is the pulse repetition frequency, means for projecting said energy pulses into space, receiver means for receiving target reflected echoes of said projected pulses, said receiver means including a heterodyne mixer, a bandpass circuit connected to the output of said heterodyne mixer, and means for supplying received echo signals to said mixer, means for supplying said generated pulses to said heterodyne mixer as a local oscillator signal, said bandpass circuit having a single passband centered at the frequency $nf_r$, the width of said passband being not greater than $f_r$.

19. A system for detecting variations in the pulse width of a periodic series of pulses having an average pulse width approximately equal to $1/nf_r$, where $f_r$ is the repetition frequency of said pulses and $n$ is an integer, said system comprising a bandpass circuit having a single passband centered at a frequency equal to $1/T_p$, where $T_p$ is the average time width of said pulses, said passband having a frequency width not greater than $f_r$, means for supplying said series of pulses to the input of said bandpass circuit, a source of signals of reference phase which have a frequency equal to $nf_r$, and phase detector means having first and second inputs, means coupling the output of said bandpass circuit to said first input of said phase detector means and means coupling said source of signals of reference phase to said second input of said phase detector means, said phase detector means being responsive jointly to signals supplied to said inputs thereof to provide an output signal which is indicative of the relative phases of the signals supplied to the two inputs thereof.

* * * * *